(12) United States Patent
Smith

(10) Patent No.: US 9,522,634 B1
(45) Date of Patent: Dec. 20, 2016

(54) HORIZONTAL RETRACTABLE VEHICLE STEP

(71) Applicant: Lund Motion Products, Inc., Buford, GA (US)

(72) Inventor: Anthony Nicholas Smith, Huntington Beach, CA (US)

(73) Assignee: Lund Motion Products, Inc., Buford, GA (US)

( * ) Notice: Subject to any disclaimer, the term of this patent is extended or adjusted under 35 U.S.C. 154(b) by 0 days.

(21) Appl. No.: 14/846,370

(22) Filed: Sep. 4, 2015

Related U.S. Application Data

(60) Provisional application No. 62/171,729, filed on Jun. 5, 2015.

(51) Int. Cl.
*B60R 3/02* (2006.01)
(52) U.S. Cl.
CPC ........................................ *B60R 3/02* (2013.01)
(58) Field of Classification Search
CPC .................................. B60R 3/02; B60R 3/002
USPC ............................................................ 280/166
See application file for complete search history.

(56) References Cited

U.S. PATENT DOCUMENTS

| | | | |
|---|---|---|---|
| 752,031 A * | 2/1904 | Chadwick | B60R 3/02 280/166 |
| 2,041,640 A * | 5/1936 | Goss | B60R 3/02 182/89 |
| 2,122,040 A * | 6/1938 | Machovec | B60R 3/02 105/443 |
| 2,125,085 A * | 7/1938 | Pool | B60R 3/02 105/437 |
| 2,583,894 A | 1/1952 | Shuck | |
| 2,764,422 A * | 9/1956 | McDonald | B60R 3/02 105/447 |
| 3,095,216 A * | 6/1963 | Browne | B60R 3/02 280/166 |
| 3,671,058 A | 6/1972 | Kent | |
| 4,110,673 A * | 8/1978 | Magy | H02H 7/0851 105/444 |
| 5,358,268 A * | 10/1994 | Hawkins | B60R 3/02 182/91 |
| 6,179,312 B1 | 1/2001 | Paschke et al. | |
| 6,325,397 B1 | 12/2001 | Pascoe et al. | |
| 6,533,303 B1 * | 3/2003 | Watson | B60R 3/02 182/150 |
| 6,641,158 B2 * | 11/2003 | Leitner | B60R 3/02 105/443 |
| 6,834,875 B2 * | 12/2004 | Leitner | B60R 3/02 105/447 |
| 6,880,843 B1 | 4/2005 | Greer, Jr. | |

(Continued)

FOREIGN PATENT DOCUMENTS

| | | |
|---|---|---|
| EP | 3002157 | 4/2016 |
| WO | WO 01/00441 | 1/2001 |

*Primary Examiner* — J. Allen Shriver, II
*Assistant Examiner* — Brian Cassidy
(74) *Attorney, Agent, or Firm* — Knobbe Martens Olson and Bear LLP

(57) ABSTRACT

A horizontally moving retractable vehicle step is attachable to a vehicle, such as a low to the ground vehicle like a van. The horizontal vehicle step can provide access to different portions of the vehicle. Further, the horizontal vehicle step can act as a safety mechanism to reduce potential harm to a user in accidentally stepping in gaps between the vehicle and a curb.

21 Claims, 12 Drawing Sheets

(56) References Cited

U.S. PATENT DOCUMENTS

| | | | | |
|---|---|---|---|---|
| 6,926,295 | B2* | 8/2005 | Berkebile | B60R 3/02 280/163 |
| 6,942,233 | B2* | 9/2005 | Leitner | B60R 3/02 105/447 |
| 6,955,370 | B2* | 10/2005 | Fabiano | B60R 3/02 280/163 |
| 7,118,120 | B2* | 10/2006 | Lee | B60R 3/02 280/163 |
| 7,163,221 | B2* | 1/2007 | Leitner | B60R 3/02 105/444 |
| 7,287,771 | B2* | 10/2007 | Lee | B60R 3/02 280/163 |
| 7,318,596 | B2* | 1/2008 | Scheuring, III | B60R 3/02 280/163 |
| 7,367,574 | B2* | 5/2008 | Leitner | B60R 3/02 280/163 |
| 7,441,790 | B2* | 10/2008 | Lechkun | B60R 3/02 280/163 |
| 7,469,916 | B2 | 12/2008 | Watson | |
| 7,487,986 | B2* | 2/2009 | Leitner | B60R 3/02 280/163 |
| 7,513,565 | B2* | 4/2009 | Watson | B60R 3/02 280/163 |
| 7,516,703 | B2* | 4/2009 | Tazreiter | B60R 3/02 105/443 |
| 7,584,975 | B2* | 9/2009 | Leitner | B60R 3/02 280/163 |
| 7,594,672 | B2* | 9/2009 | Piotrowski | B60R 3/02 280/163 |
| 7,621,546 | B2* | 11/2009 | Ross | B60R 3/02 280/163 |
| 7,637,519 | B2 | 12/2009 | Leitner | |
| 7,673,892 | B2* | 3/2010 | Kuntze | B60R 3/002 280/163 |
| 7,712,755 | B2* | 5/2010 | Yang | B60R 3/02 280/163 |
| 7,740,260 | B2* | 6/2010 | VanBelle | B60R 3/02 180/90.6 |
| 7,740,261 | B2 | 6/2010 | Leitner | |
| 7,934,737 | B2* | 5/2011 | Okada | B60R 3/02 280/163 |
| 7,976,042 | B2* | 7/2011 | Watson | B60R 3/02 280/166 |
| 8,042,821 | B2* | 10/2011 | Yang | B60R 3/02 280/163 |
| 8,052,162 | B2* | 11/2011 | Yang | B60R 3/02 280/163 |
| 8,056,913 | B2* | 11/2011 | Kuntze | B60R 3/02 280/163 |
| 8,070,173 | B2* | 12/2011 | Watson | B60R 3/02 280/163 |
| 8,136,826 | B2* | 3/2012 | Watson | B60R 3/02 280/163 |
| 8,157,277 | B2 | 4/2012 | Leitner | |
| 8,177,247 | B1 | 5/2012 | Carr | |
| 8,297,635 | B2 | 10/2012 | Agoncillo | |
| 8,342,550 | B2* | 1/2013 | Stickles | B60R 3/00 280/163 |
| 8,342,551 | B2 | 1/2013 | Watson | |
| 8,366,129 | B2* | 2/2013 | Salmon | B60R 3/02 280/163 |
| 8,469,380 | B2* | 6/2013 | Yang | B60R 3/02 182/127 |
| 8,668,217 | B2* | 3/2014 | Ziaylek | B60R 3/02 280/163 |
| 8,827,294 | B1 | 9/2014 | Leitner | |
| 8,833,782 | B2* | 9/2014 | Huotari | B60R 3/02 280/163 |
| 8,936,266 | B2* | 1/2015 | Leitner | B60R 3/02 280/163 |
| 9,272,667 | B2* | 3/2016 | Smith | B60R 3/02 |
| 2005/0151340 | A1* | 7/2005 | Leitner | B60R 3/02 280/166 |
| 2008/0084045 | A1* | 4/2008 | Filias | B60R 3/02 280/166 |
| 2008/0224438 | A1* | 9/2008 | Okada | B60R 3/02 280/163 |
| 2009/0308688 | A1* | 12/2009 | Tayar | B60R 3/02 182/89 |
| 2010/0194070 | A1* | 8/2010 | Stauffer | B60R 3/002 280/166 |
| 2015/0123374 | A1* | 5/2015 | Smith | B60R 3/02 280/166 |
| 2015/0123375 | A1* | 5/2015 | Leitner | B60R 3/02 280/166 |
| 2015/0274079 | A1* | 10/2015 | Yang | B60R 3/02 280/166 |
| 2015/0329056 | A1* | 11/2015 | Leitner | B60R 3/02 280/166 |
| 2016/0039346 | A1* | 2/2016 | Yang | B60R 3/007 280/166 |

* cited by examiner

HORIZONTAL RETRACTABLE VEHICLE STEP

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally to a retractable vehicle step which is movable between a retracted or storage position and an extended position and can increase safety to a user.

Description of the Related Art

It is commonly known to add a running board or similar fixed stepping assist to the side of a motor vehicle, especially to a vehicle with a relatively high ground clearance. However, these fixed running boards and other stepping assists have had several drawbacks. First, a fixed running board is often too high to act as a practical stepping assist and is therefore not very effective in reducing the initial step height for the vehicle user. In addition, when using a relatively high running board, the user is likely to hit his or her head while climbing into the vehicle cab. Furthermore, a fixed running board often extends a significant distance from the side of the vehicle, and can be a source of dirt or grime that rubs onto the user's pants or other clothing as the user steps out of the vehicle onto the ground surface. Such a fixed running board is also frequently struck when the owner of an adjacent parked vehicle opens his door. Finally, a fixed running board or step reduces the ground clearance of a vehicle, and can be damaged or torn off entirely when the vehicle is used for off-road driving.

SUMMARY

Disclosed herein are embodiments of a horizontally extending step comprising an attachment frame configured to attach to a vehicle and a stepping fixture comprising a pair of arms rotatably attached to the frame and extending away from the frame, a support component rotatably connected to the pair of arms, and a stepping platform attached to the support component, said stepping platform defining a stepping surface, wherein the stepping fixture is configured to rotate between a stowed and deployed position, and wherein the stepping platform remains generally parallel to a plane $P_s$ defined by the stepping surface when the stepping platform is in the stowed position in the stowed and the deployed position.

In some embodiments, an angle between the plane defined by the stepping surface extending outwards away from the vehicle and a horizontal plane extending outwards away from the vehicle may not decrease in angle more than 15° from the stowed to the deployed position. In some embodiments, an angle between the plane defined by the stepping surface extending outwards away from the vehicle and a horizontal plane extending outwards away from the vehicle may not decrease or increase in angle more than 15° from the stowed to the deployed position. In some embodiments, the stepping platform can remain generally parallel to $P_s$ from the stowed to the deployed position.

In some embodiments, the stepping platform and support component can be a single piece. In some embodiments, the pair of arms are not parallel in the stowed or deployed positions. In some embodiments, the support component can be generally flat. In some embodiments, the support component can remain generally parallel to $P_s$ from the stowed to the deployed position. In some embodiments, the horizontally extending step can be self-energizing in the stowed position. In some embodiments, the horizontally extending step can be self-energizing in the deployed position.

In some embodiments, the plane defined by the stepping surface can have a positive angle with relation to a horizontal plane when the stepping fixture is in an intermediate position located halfway between the stowed and deployed position. In some embodiments, a distal tip of the stepping platform can remain within 1 inch in the vertical direction between the stowed position, the deployed position, and an intermediate position located halfway between the stowed and deployed positions. In some embodiments, a distal tip of the stepping platform can remain within 0.5 inches in the vertical direction between the stowed position, the deployed position, and an intermediate position located halfway between the stowed and deployed positions.

Also disclosed herein are embodiments of a horizontally extending step comprising a pair of arms configured to be rotatably attached to a vehicle and extending away from the vehicle and a stepping platform rotatably connected to the pair of arms, wherein the stepping fixture is configured to rotate between a stowed, an intermediate, and deployed position, the intermediate position being located halfway between the stowed and deployed positions, and wherein the stepping platform has a generally fixed orientation between the stowed, intermediate, and deployed positions.

In some embodiments, the horizontally extending step can be self-energizing in the stowed position. In some embodiments, the horizontally extending step can be self-energizing in the deployed position.

Also disclosed herein are embodiments of a horizontally extending step comprising a frame configured to attach to a vehicle and a stepping fixture comprising a distal and a proximal arm rotatably attached to the frame and extending away from the frame, a support component rotatably connected to the pair of arms, and a stepping platform attached to the support component, the stepping platform being closer to the distal arm than the proximal arm, wherein the stepping fixture is configured to rotate between a stowed, an intermediate, and deployed position, the intermediate position being located halfway between the stowed and deployed positions, and wherein an angle between the stepping platform and the distal arm is at least 110° in the deployed position.

In some embodiments, the angle can be greater than 120° in the deployed position. In some embodiments, the angle can be greater than 135° in the deployed position. In some embodiments, the angle can be less than 180° in the deployed position. In some embodiments, the horizontally extending step can be self-energizing in the stowed position. In some embodiments, the horizontally extending step can be self-energizing in the deployed position.

DETAILED DESCRIPTION

Disclosed herein are embodiments of stepping structure for assisting a user to access a vehicle. In particular, embodiments of the disclosed stepping structure can move generally horizontally, and thus can be advantageous for use in low to the ground vehicles, such as vans and cars. In some embodiments, the horizontal vehicle step can extend outwards while avoiding curbs or other ground interferences due to the horizontal motion of the vehicle step. In some embodiments, vertical motion of the horizontal vehicle step can be limited.

Embodiments of the disclosed horizontal vehicle step can improve safety for a person having a low to the ground vehicle, such as a van. Typically in loading and unloading operations, the vehicle is parked close to, but not directly on top of, a curb. Therefore, there is a gap between the curb and the door of the vehicle. A person stepping in and out of the vehicle, especially while carrying a heavy load, can easily misstep and place their foot in the gap between the curb and the vehicle. This could lead to significant injury to the foot or leg of the person. Accordingly, embodiments of the disclosed horizontal vehicle step can be deployed to extend into the gap, which can prevent serious injury.

Figure 1:
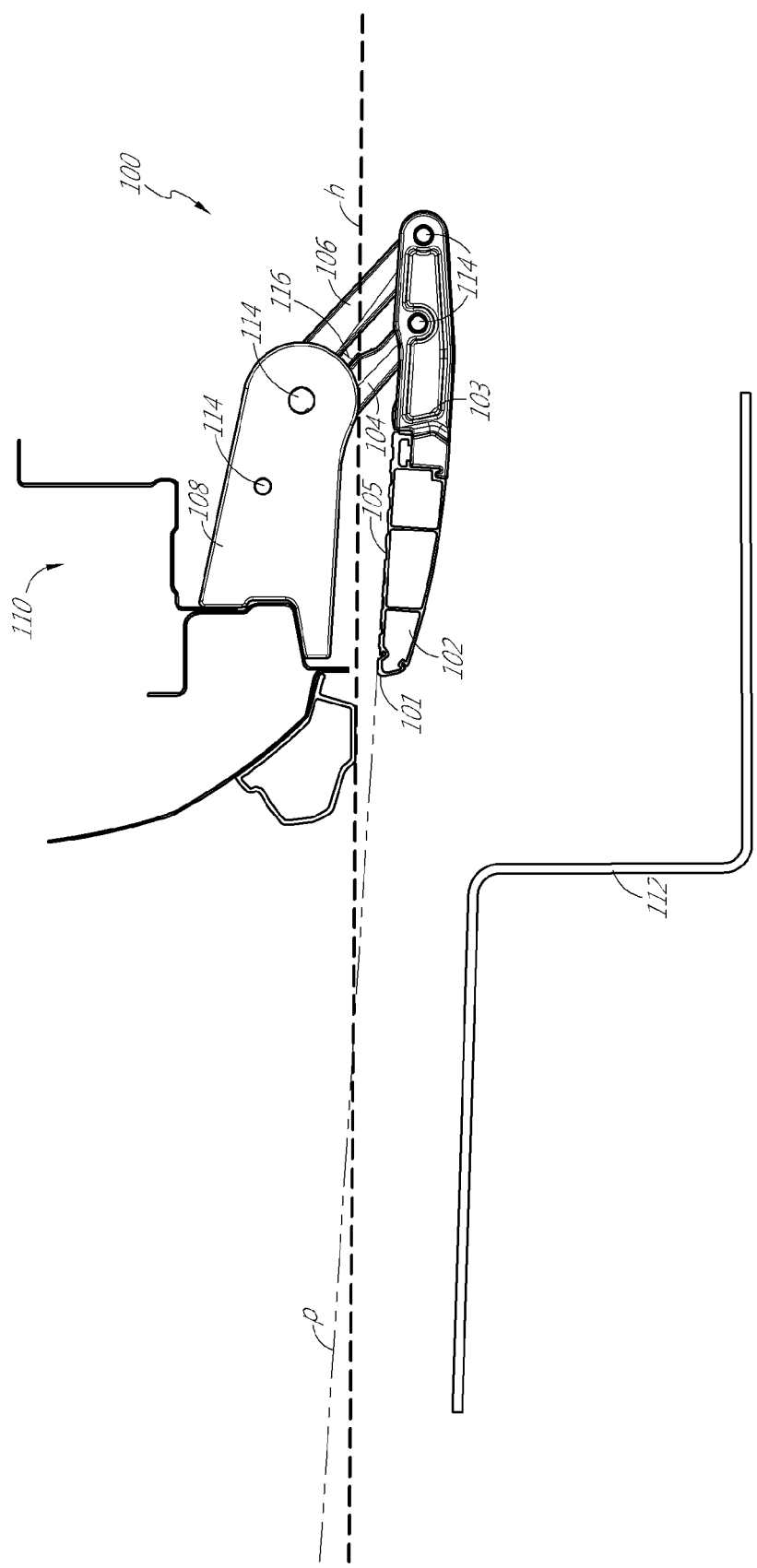
FIG. 1 illustrates an embodiment of a horizontal vehicle step in a stowed position.

FIG. 1 illustrates an embodiment of such a horizontal vehicle step 100 in a stowed position. As shown, the horizontal vehicle step 100 can be composed of numerous components, further discussed below, which can allow for translation of the horizontal vehicle step 100 from a stowed position (FIG. 1) through an intermediate position (FIG. 2) and to a deployed or substantially deployed position (FIG. 3) and back again, and can help a user to enter and exit a vehicle. In some embodiments, the horizontal vehicle step 100 can be located under a vehicle door, such as the front or back doors, or below the trunk, though the particular location of the horizontal vehicle step 100 is not limiting. In some embodiments, the horizontal vehicle step 100 can move to the deployed position when a vehicle door is opened and move to a stowed position when an open vehicle door is closed. In some embodiments, the horizontal vehicle step 100 can be moved manually. In some embodiments, the horizontal vehicle step 100 can move through the press of a button or activation of a switch, and can operate independently of motion of a vehicle door.

Figure 8:
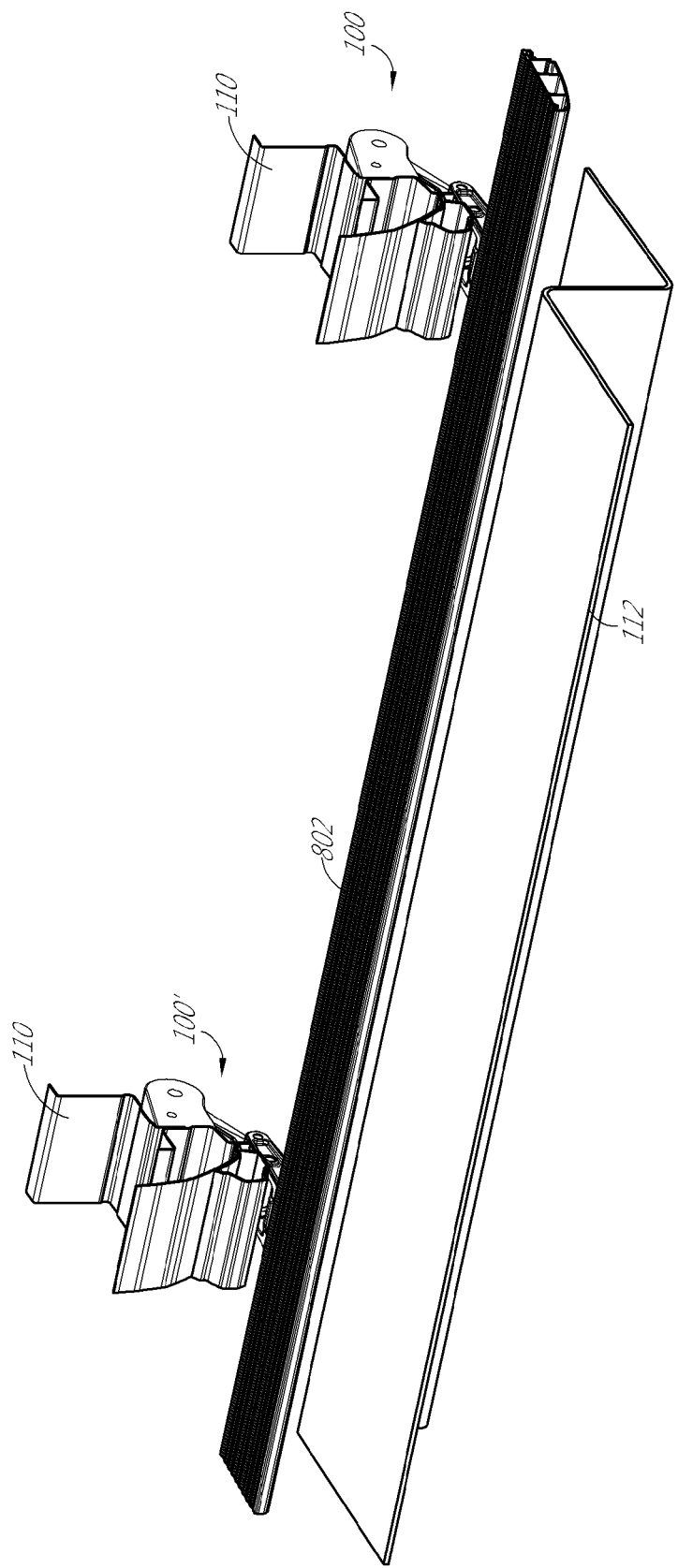
FIG. 8 illustrates two embodiments of a horizontal vehicle step mechanism attached to an extended horizontal step in a deployed position.

As shown, the horizontal vehicle step 100 can contain a stepping platform 102. The stepping platform 102 can extend generally parallel to the ground and can be configured for a user to step on to allow for access into a vehicle. The stepping platform 102 can be sized to generally fit a user's foot in some embodiments. Thus, a plurality of different stepping platforms 102 can be used for different parts of a vehicle. In some embodiments, the stepping platform 102 can extend along a substantially length of a vehicle, such as to be configured like a rail as shown in FIG. 8. Accordingly, in some embodiments only a single stepping platform 102 is used on each side of the vehicle for the rail-like configuration. In some embodiments, the stepping platform 102 can have gripping or high friction material on its upper side to help a user enter a vehicle.

Figure 5:
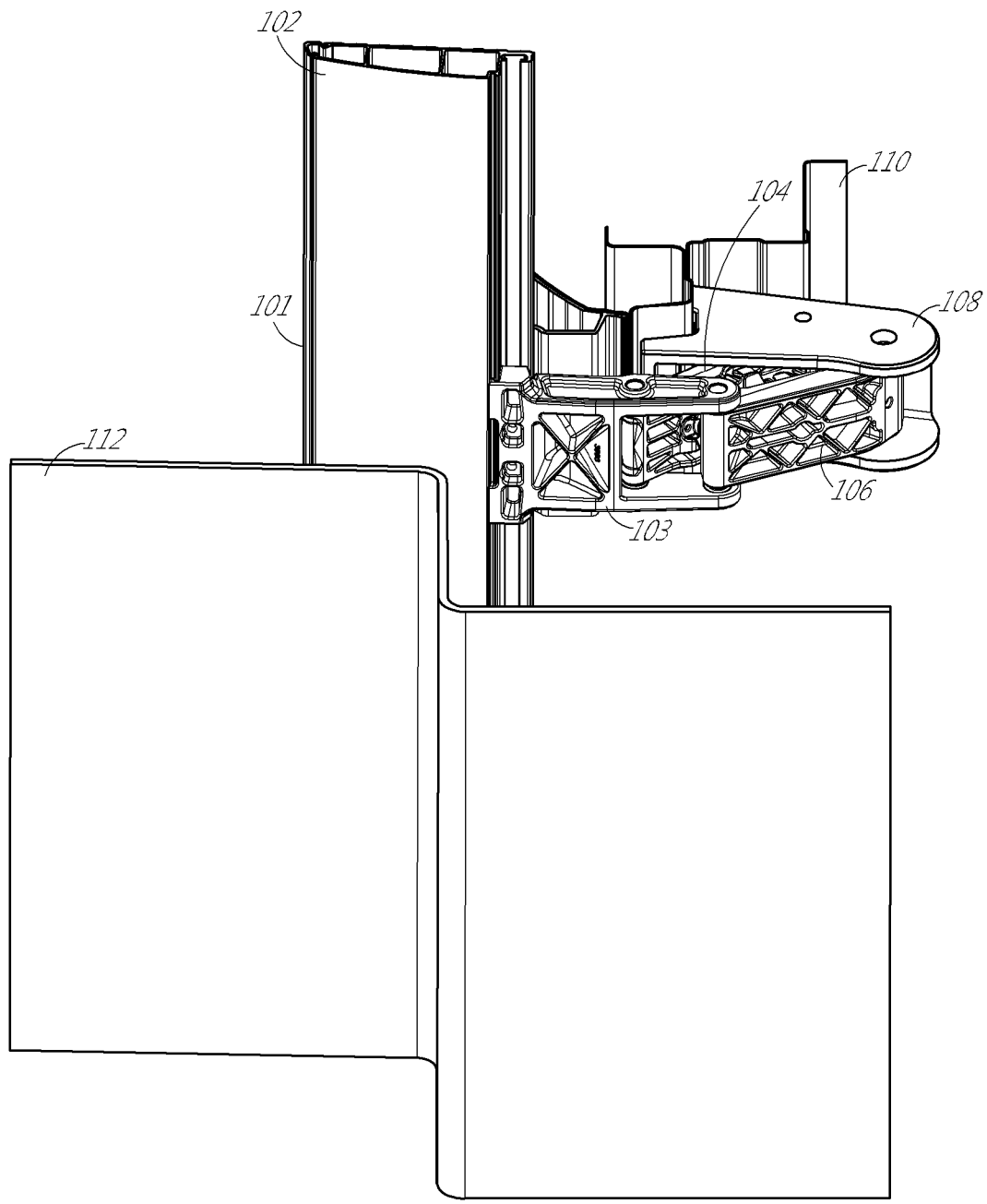
FIG. 5 illustrates an underneath view of an embodiment of a horizontal vehicle step in a deployed position.

The stepping platform 102 can connect to a support component 103. In some embodiments, the stepping platform 102 is attached to the support component 103 so that the stepping platform 102 and support component 103 translate and/or rotate as one unit. In some embodiments, the stepping platform 102 can rotate separately from the support component 103. In some embodiments, the support component 103 can be generally flat and run generally parallel to a horizontal plane h. In some embodiments, support component 103 and stepping platform 102 can be a single piece. In some embodiments, the stepping platform 102 can be integrally formed with the support component 103. In some embodiments, the two pieces can be attached to one another through, for example, screws, though the particular attachment means does not limit the disclosure. In some embodiments, the support component 103 can be substantially thinner than the stepping platform 102, as shown in FIG. 5.

A pair of arms 104/106 can rotatably attach to the support component 103, allowing for rotation of the support component 103, and thus the stepping platform 102. The arms 104/106 can be attached to the support component 103 through the rotation axes 114. In some embodiments, either one or both of arms 104/106 can have a stop (or bumper) 116, which can be used to prevent the horizontal vehicle step 100 from moving outside a desired rotation. The stops 116 can be, for example, rubber to prevent motion of the horizontal vehicle step 100 while preventing scratching or other damage. In some embodiments the stops 116 can contain a general hollow cavity allowing for compressing of the stops 116 (e.g., allowing them to be flattened) during rotation of the arms 104/106. This compression can allow for the arms 104/106 to rotate farther than if the stops 116 did not have the hollow cavity, for example allowing the stepping platform 102 angle p to be approximately parallel to that of plane h as discussed in detail below. However, the particular makeup of the stops 116 does not limit the disclosure. In some embodiments, the combination of stepping platform 102, support component 103, and arms 104/106 can be known as the stepping fixture. While only two arms are shown, more arms could be used as well. Further, each arm 104/106 could be broken into different segments that may or may not rotate with respect to each other. In some embodiments, another bar can connect arms 104/106.

On the opposite end from the support component 103, arms 104/106 can attach to a frame 108. The frame 108 can then attached to a vehicle frame 110, such as the underside or sidewalls of a vehicle. However, the positioning of the frame 108 onto the vehicle frame 110 does not limit the disclosure, and any particular location can be used so that the stepping platform 102 can be accessed by a user. Further, the particular size and dimensions of the frame 108 do not limit the disclosure. In some embodiments, such as shown in FIG. 1, the frame 108 may extend towards the centerline of the vehicle. The arms 104/106 can be attached to frame 108 through the rotation axes 114. In some embodiments, frame 108 may not be used, and the arms 104/106 can be attached directly to the underside of a vehicle. In some embodiments, the instant center of the horizontal vehicle step 100 can be located within the horizontal vehicle step 100 when the horizontal vehicle step 100 is in the deployed or stowed position, or in both positions. In some embodiments, the instant center of the horizontal vehicle step 100 is not located outside of the horizontal vehicle step 100. For example, at any given moment, when the horizontal vehicle step 100 is pivoting from one position to another, the stepping platform 102 can be considered to be pivoting about one point in space (e.g., an "instant center") within the horizontal vehicle step 100, as viewed perpendicular to the rotational axes 114, such as viewed from the perspective of FIG. 1. In some embodiments, this one point could correspond to being within the horizontal dimension of the stepping platform 102 (corresponding to an x axis in an x-y coordinate system), could correspond to being within vertical dimension of the stepping platform 102 (corresponding to a y axis in an x-y coordinate system), or could correspond to being within cross-section of the stepping platform 102 in both the horizontal and vertical dimension.

Figure 3:
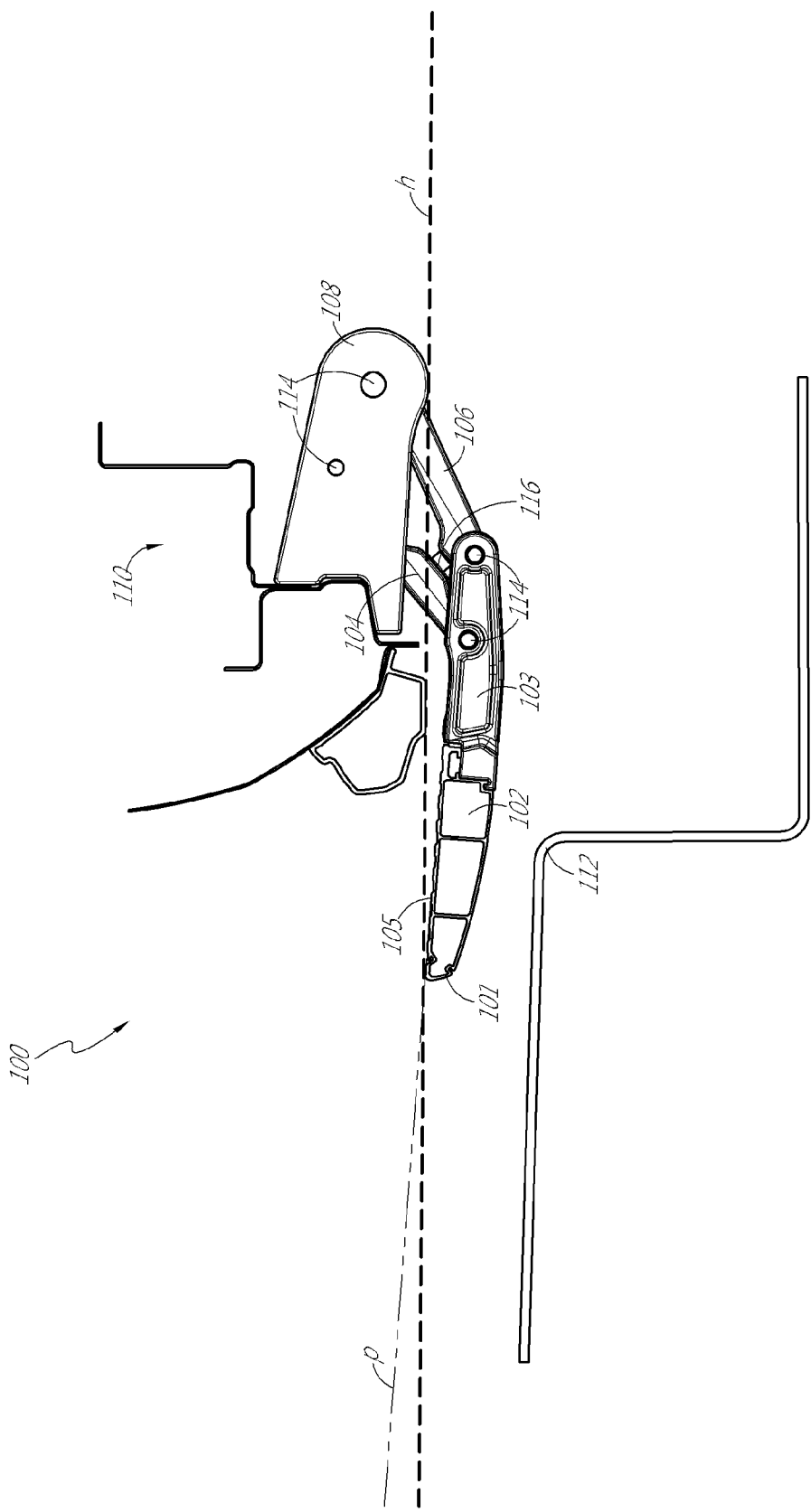
FIG. 3 illustrates an embodiment of a horizontal vehicle step in a deployed position.
Figure 4:
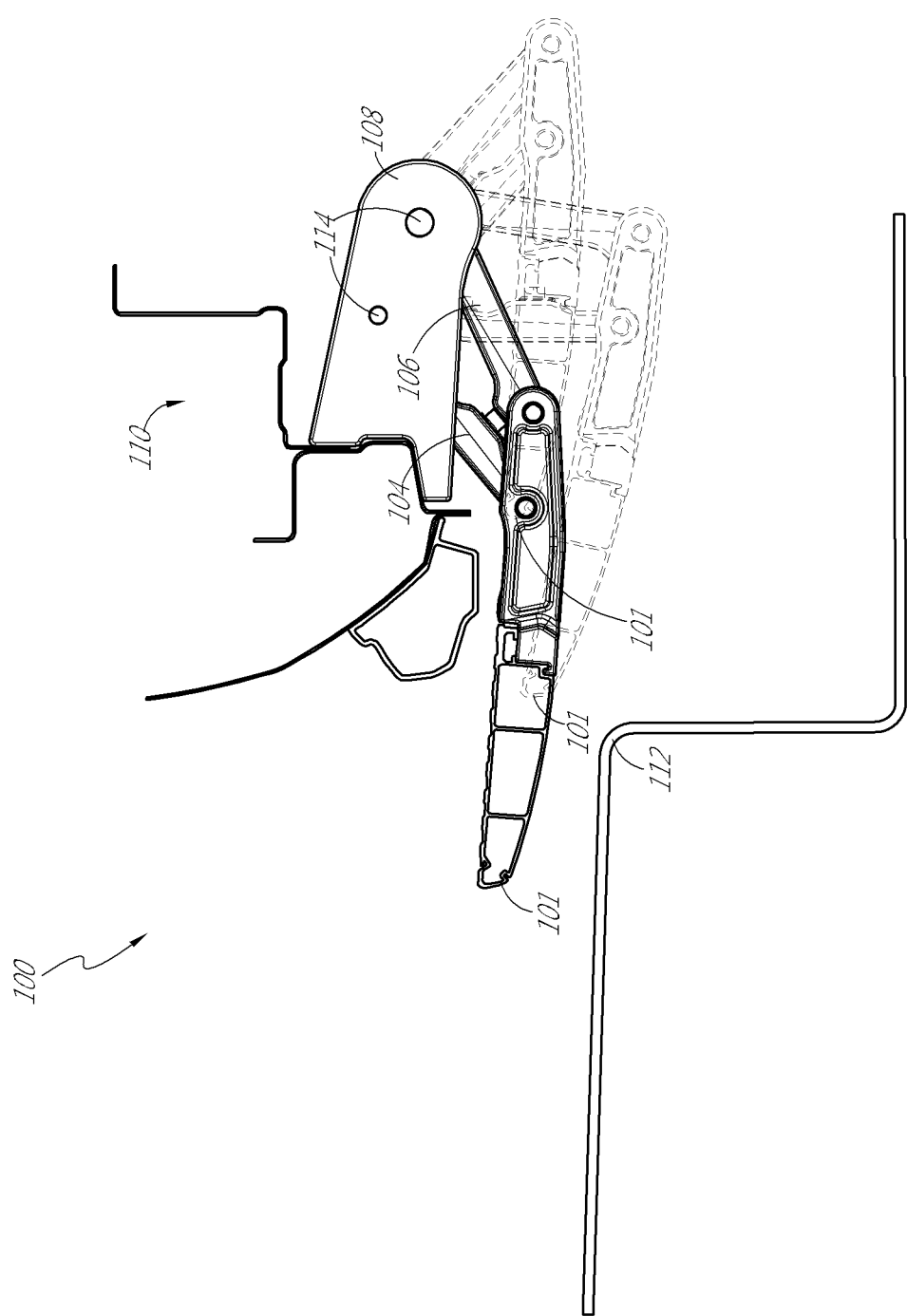
FIG. 4 illustrates an overlaid view of the motion of an embodiment of a horizontal vehicle step.

FIG. 4 illustrates three different positions of an embodiment of a horizontal vehicle step 100 superimposed on one another. Specifically, FIG. 4 illustrates the deployed (FIG. 3), intermediate (FIG. 2), and stowed positions (FIG. 1) of an embodiment of a horizontal vehicle step 100. As shown in FIG. 4, the deployed position (leftmost) is located approximately the same vertical position as the stowed position (rightmost). In some embodiments, the deployed position is at the same vertical position as the stowed position.

In some embodiments, the front edge 101 of the horizontal vehicle step 100 is at approximately the same position, or slightly below, the front edge 101 in the deployed or stowed positions. In some embodiments, the vertical position of the front edge 101 in the intermediate position is within about 0.1, 0.3, 0.5, 1, 2, 3, or 4 inches from the vertical position of the front edge 101 in the deployed or stowed position. In some embodiments, the vertical position of the front edge 101 in the intermediate position is less than about 0.1, 0.3, 0.5, 1, 2, 3, or 4 inches from the vertical position of the front edge 101 in the deployed or stowed position.

In some embodiments, the angle between plane h and the plane p formed by the stepping platform 102 is the same in the stowed position as in the deployed position. Accordingly, in some embodiments the stepping platform 102 has a generally fixed orientation between the deployed and stowed positions. In some embodiments, the angle between plane h and the plane p formed by the stepping platform 102 is within about 0, 1, 5, 10, 15, or 20° in the stowed position as in the deployed position. In some embodiments, the angle between plane h and the plane p formed by the stepping platform 102 is greater than about 0, 1, 5, 10, 15, or 20° in the stowed position as in the deployed position. In some embodiments, the angle between plane h and the plane p formed by the stepping platform 102 is less than about 0, 1, 5, 10, 15, or 20° in the stowed position as in the deployed position.

In some embodiments, the angle between plane h and the plane p formed by the stepping platform 102 is the same in the stowed position as in the intermediate and deployed position. Accordingly, in some embodiments the stepping platform 102 has a generally fixed orientation between the deployed, intermediate, and stowed positions. In some embodiments, the angle between plane h and the plane p formed by the stepping platform 102 is within about 0, 1, 5, 10, 15, or 20° in the stowed position as in the intermediate and deployed position. In some embodiments, the angle between plane h and the plane p formed by the stepping platform 102 is greater than about 0, 1, 5, 10, 15, or 20° in the stowed position as in the intermediate and deployed position. In some embodiments, the angle between plane h and the plane p formed by the stepping platform 102 is less than about 0, 1, 5, 10, 15, or 20° in the stowed position as in the intermediate and deployed position.

In some embodiments, the maximum change in angle between the plane h and the plane p formed from the top of the stepping platform 102 throughout motion of the horizontal vehicle step 100 is within about 0, 1, 5, 10, 15, or 20° (or within about −0, −1, −5, −10, −15, or −20°). In some embodiments, the maximum change in angle between the plane h and the plane p formed from the top of the stepping platform 102 throughout motion of the horizontal vehicle step 100 is less than about 0, 1, 5, 10, 15, or 20° (or less than about −0, −1, −5, −10, −15, or −20°). In some embodiments, the maximum change in angle between the plane h and the plane p formed from the top of the stepping platform 102 throughout motion of the horizontal vehicle step 100 is greater than about 0, 1, 5, 10, 15, or 20° (or great than about −0, −1, −5, −10, −15, or −20°).

In some embodiments, the plane p formed by the stepping platform 102 is approximately parallel to plane h in the deployed position. In some embodiments, the plane p formed by the stepping platform 102 is approximately parallel to plane h in the stowed position. In some embodiments, the plane p formed by the stepping platform 102 is approximately parallel to plane h in the intermediate position.

Figure 2:
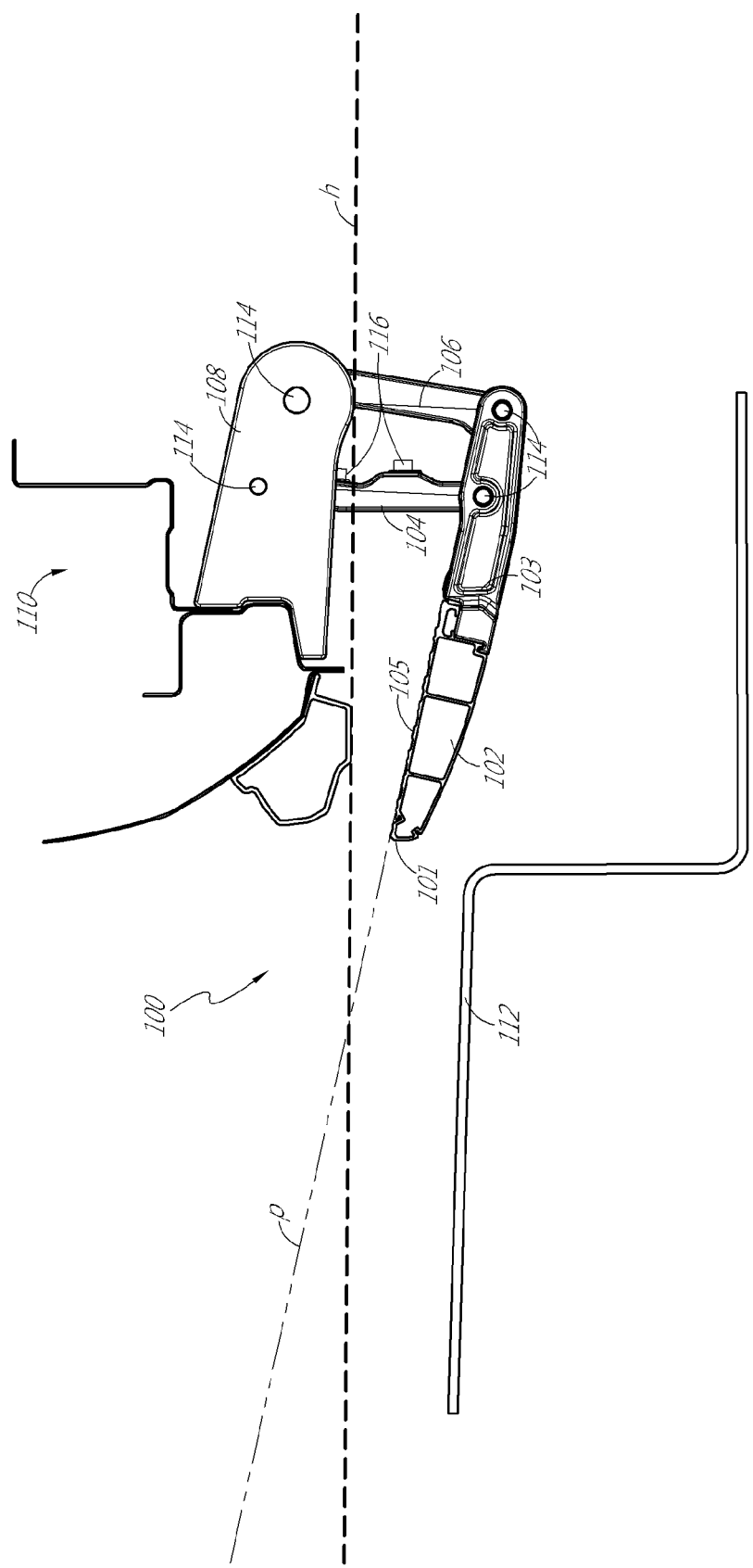
FIG. 2 illustrates an embodiment of a horizontal vehicle step in an intermediate position.

In some embodiments, the plane p formed between plane h and the plane p formed by a top surface 105 of the stepping platform 102 is positive (e.g., as shown in FIG. 2).

In some embodiments, when the horizontal vehicle step 100 is in the deployed position as shown in FIG. 3, the angle between the stepping platform 102 and arm 104 can be obtuse. In some embodiments, the angle between the stepping platform 102 and arm 104 can be about 90, 100, 110, 120, 130, 140, 150, 160, or 170°. In some embodiments, the angle between the stepping platform 102 and arm 104 can be greater than about 90, 100, 110, 120, 130, 140, 150, 160, or 170°. In some embodiments, the angle between the stepping platform 102 and arm 104 can be less than about 100, 110, 120, 130, 140, 150, 160, 170, or 180°.

In some embodiments, when the horizontal vehicle step 100 is in the deployed position as shown in FIG. 3, the angle between the stepping platform 102 and arm 106 can be obtuse. In some embodiments, the angle between the stepping platform 102 and arm 106 can be about 90, 100, 110, 120, 130, 140, 150, 160, or 170°. In some embodiments, the angle between the stepping platform 102 and arm 106 can be greater than about 90, 100, 110, 120, 130, 140, 150, 160, or 170°. In some embodiments, the angle between the stepping platform 102 and arm 106 can be less than about 100, 110, 120, 130, 140, 150, 160, 170, or 180°.

FIG. 4 illustrate the general motion and positioning of an embodiment of a horizontal vehicle step 100. As shown, the horizontal vehicle step 100 can remain generally parallel to horizontal plane "h." This plan can be generally parallel to the underside of a vehicle or can be generally parallel to the ground.

In some embodiments, throughout all positions of the horizontal vehicle step 100, the plane p created by the top surface of stepping member 102 can stay within about 30, 25, 20, 15, 10, 5, 3, 1, or 0° of plane h. In some embodiments, throughout all positions of the horizontal vehicle step 100, the plane p created by the top surface of stepping member 102 can stay within less than about 30, 25, 20, 15, 10, 5, 3, or 1° of plane h.

In some embodiments, the stowed position of horizontal vehicle step 100, shown in FIG. 1, can be approximately the same angle away from plane h as the deployed position of horizontal vehicle step 100, shown in FIG. 1. Further, in some embodiments, the stowed position of horizontal vehicle step 100 can have approximately the same vertical position as the deployed position of horizontal vehicle step 100. In some embodiments, the stowed position of horizontal vehicle step 100 can be within about 1, 2, 3, or 4 inches of the vertical position as the deployed position of horizontal vehicle step 100. In some embodiments, the stowed position of horizontal vehicle step 100 can be less than about 1, 2, 3, or 4 inches of the vertical position as the deployed position of horizontal vehicle step 100

Embodiments of the disclosed horizontal vehicle step 100 can be useful for vehicles having a lower base than, for example, a truck or SUV. Because the vehicles can have a lower base, it can be advantageous to take up less area during the motion of the horizontal vehicle step 100 to avoid impediments on the ground, such as a curb 112 as shown in the figures.

Accordingly, as embodiments of the disclosed horizontal vehicle step 100 covers less of an area during deployment and stowage, it can be advantageous for vehicles that are located closer to the ground.

Figure 6:
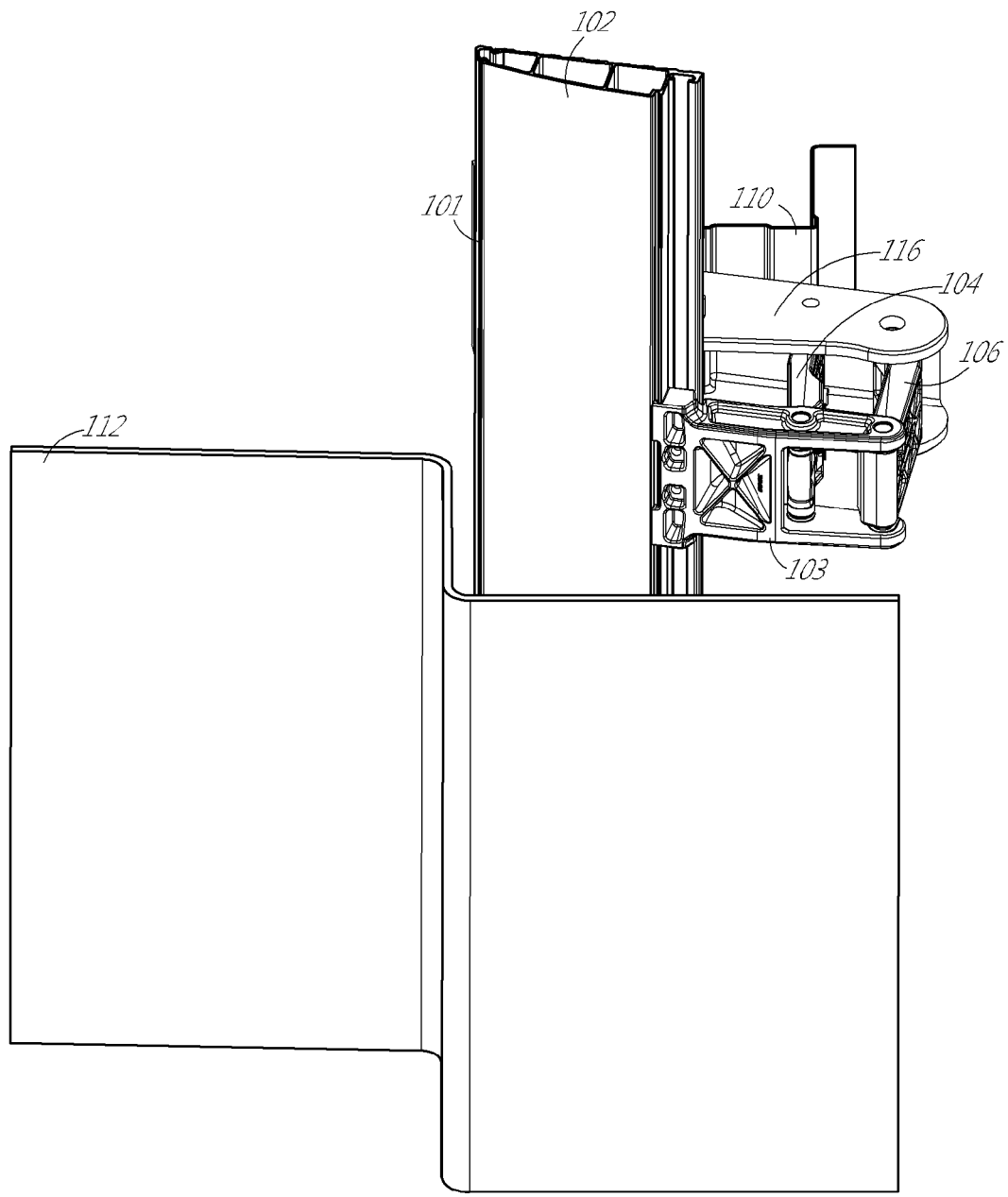
FIG. 6 illustrates an underneath view of an embodiment of a horizontal vehicle step in an intermediate position.
Figure 7:
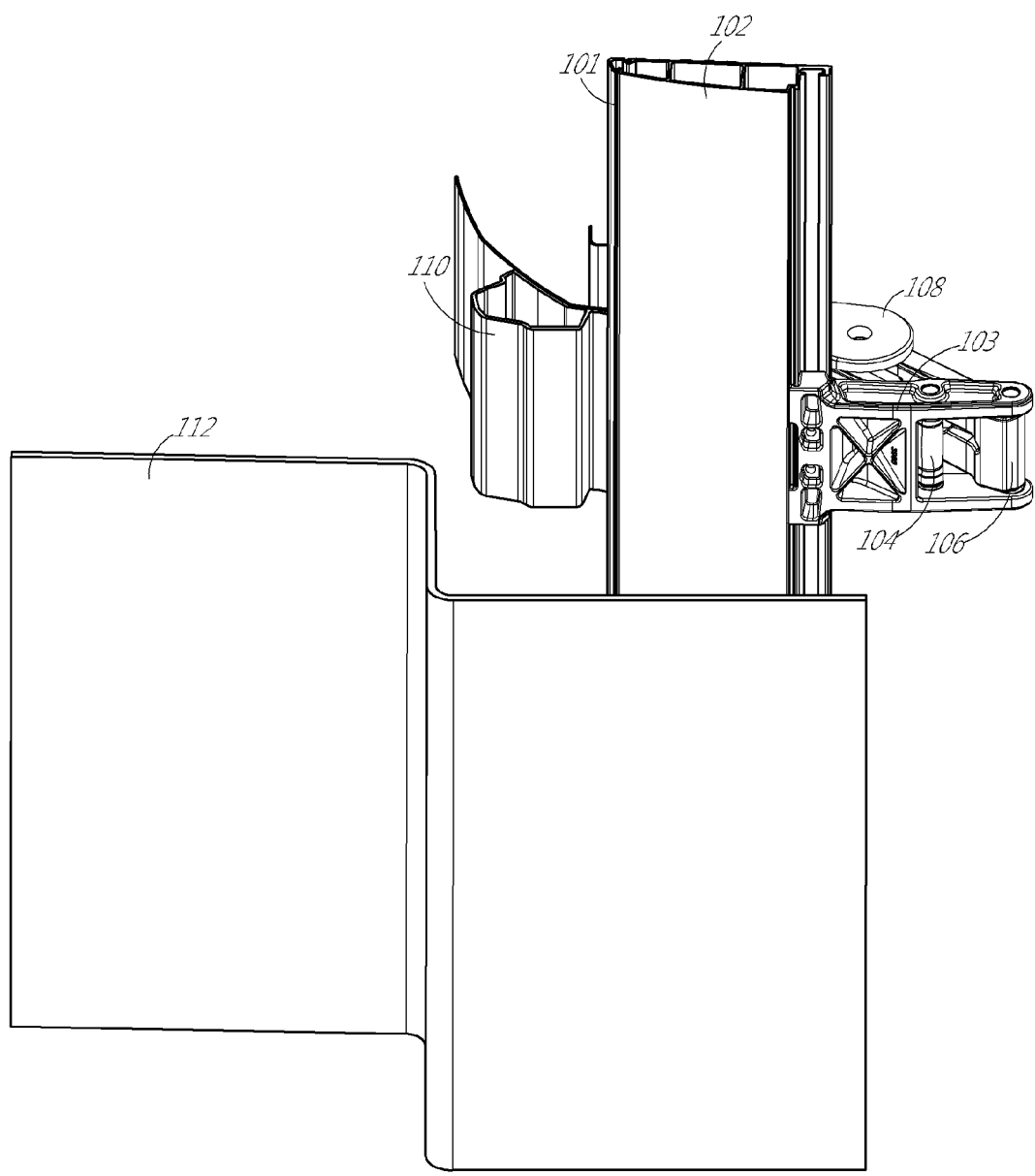
FIG. 7 illustrates an underneath view of an embodiment of a horizontal vehicle step in a stowed position.

FIG. 5-7 illustrate a below viewpoint of embodiments of a horizontal vehicle step 100 in the deployed (FIG. 5), intermediate (FIG. 6), and stowed (FIG. 7) positions.

Figure 9:
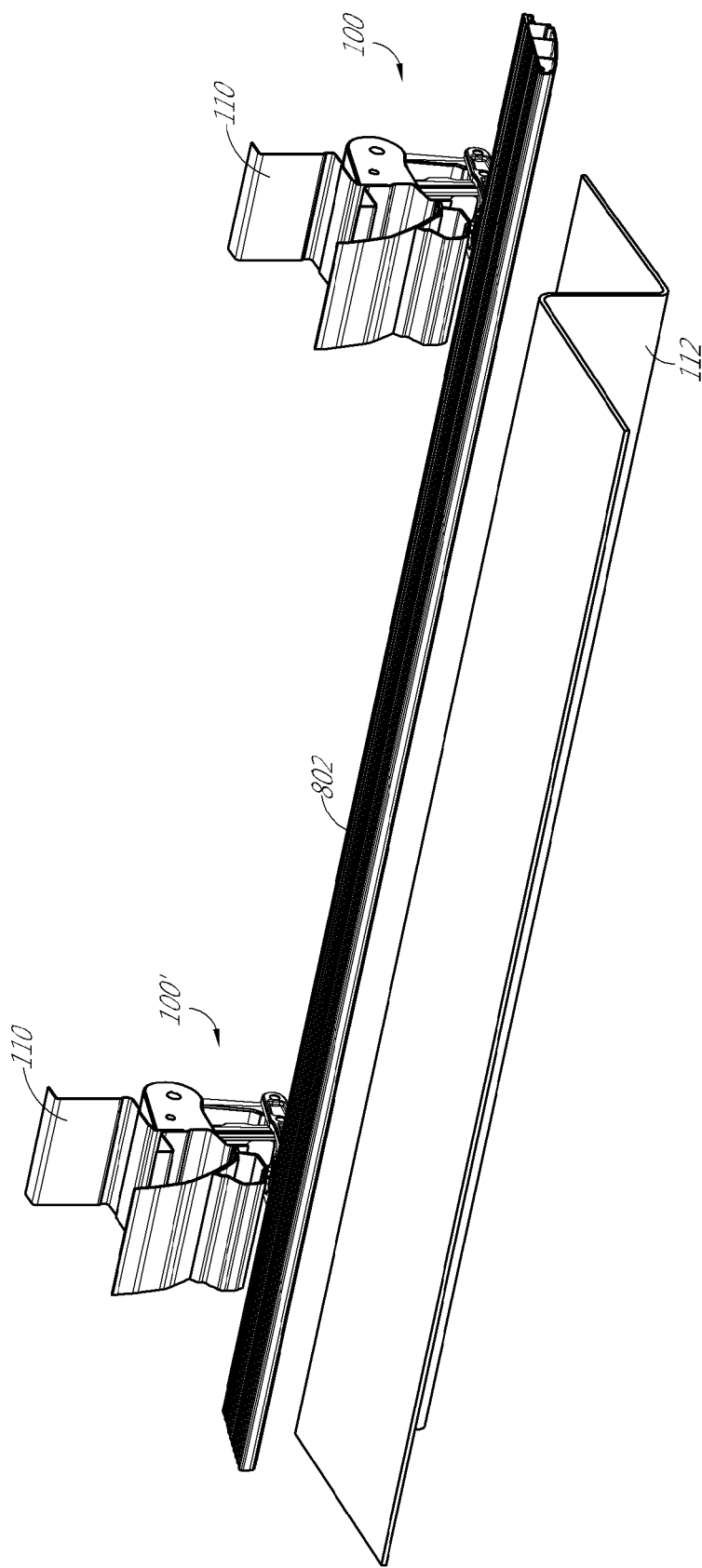
FIG. 9 illustrates two embodiments of a horizontal vehicle step mechanism attached to an extended horizontal step in an intermediate position.
Figure 10:
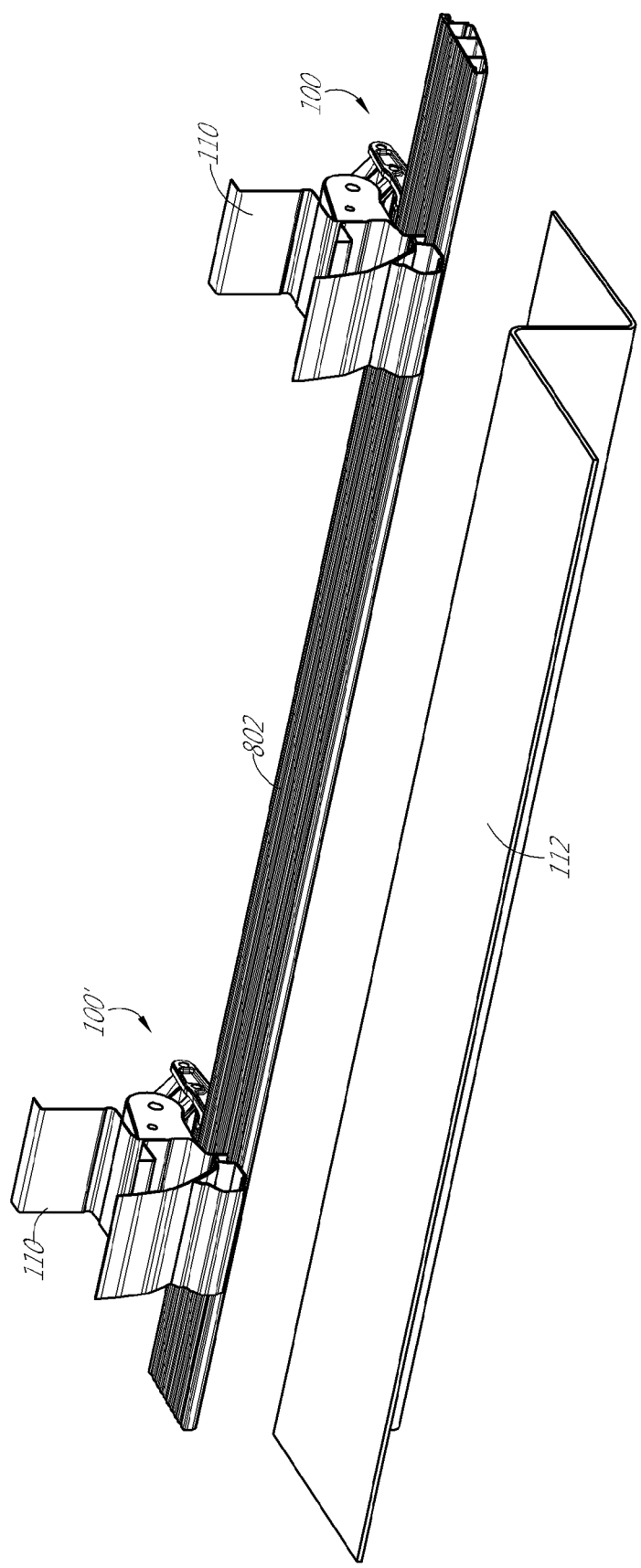
FIG. 10 illustrates two embodiments of a horizontal vehicle step mechanism attached to an extended horizontal step in a stowed position.

FIG. 8-10 illustrate an embodiment which can use a plurality of horizontal steps on a single side of a vehicle in order to, for example, retain movable running boards. As shown, a first horizontal vehicle step 100 and a second horizontal vehicle step 100' can be used to hold a horizontal running board 802 similar to what is described in detail above. More can be used as well, and the number of attachment mechanisms does not limit the disclosure. In some embodiments, the horizontal vehicle steps 100/100' can move in concert, allowing the horizontal running board 802 to move from the deployed position (FIG. 8), through the intermediate position (FIG. 9) and into the deployed position (FIG. 10).

Figure 11:
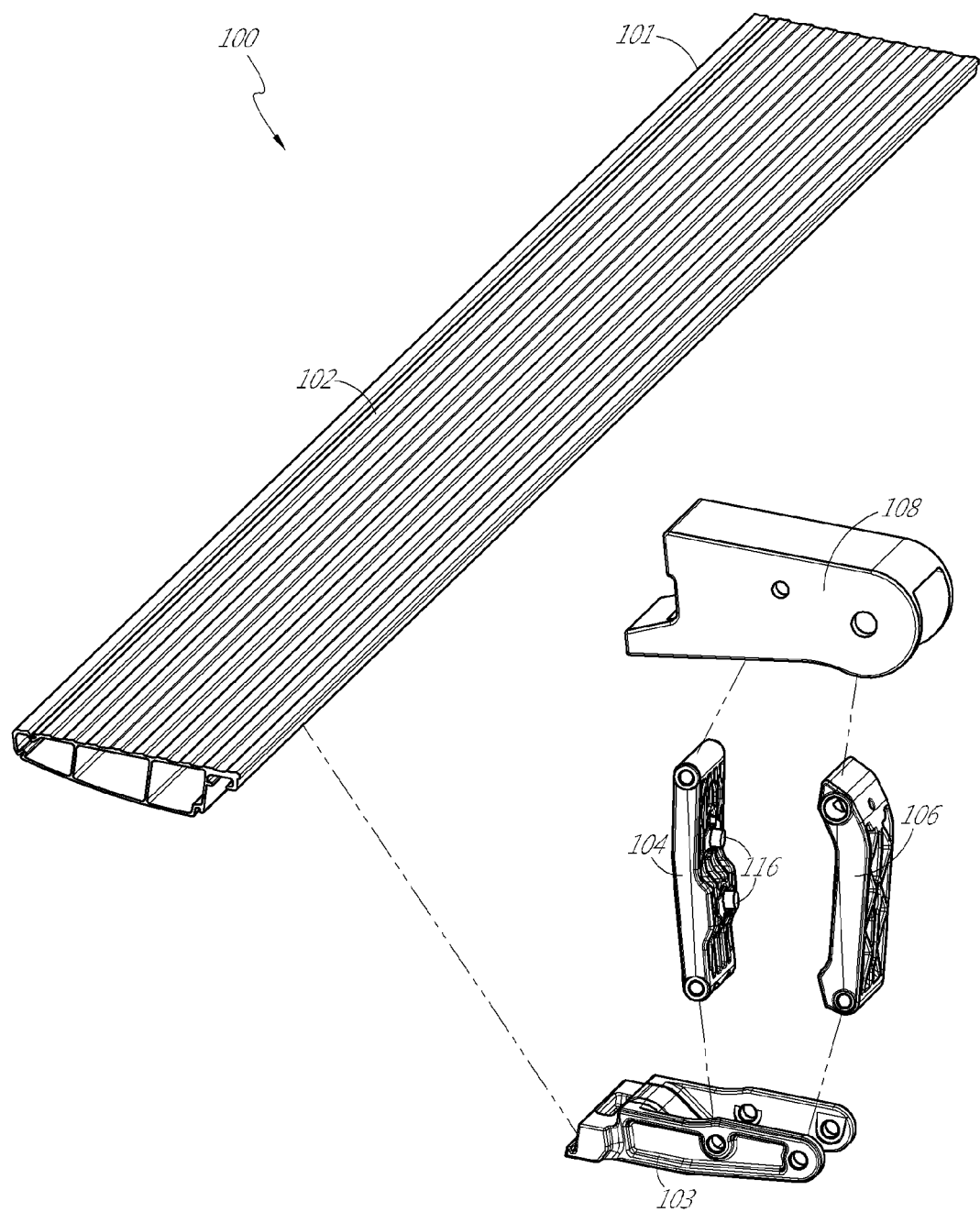
FIG. 11 illustrates an exploded view of an embodiment of a horizontal vehicle step.

FIG. 11 illustrates an exploded viewpoint of an embodiment of a horizontal vehicle step 100, illustrates an example of how components of the horizontal vehicle step 100 can fit together.

Figure 12:
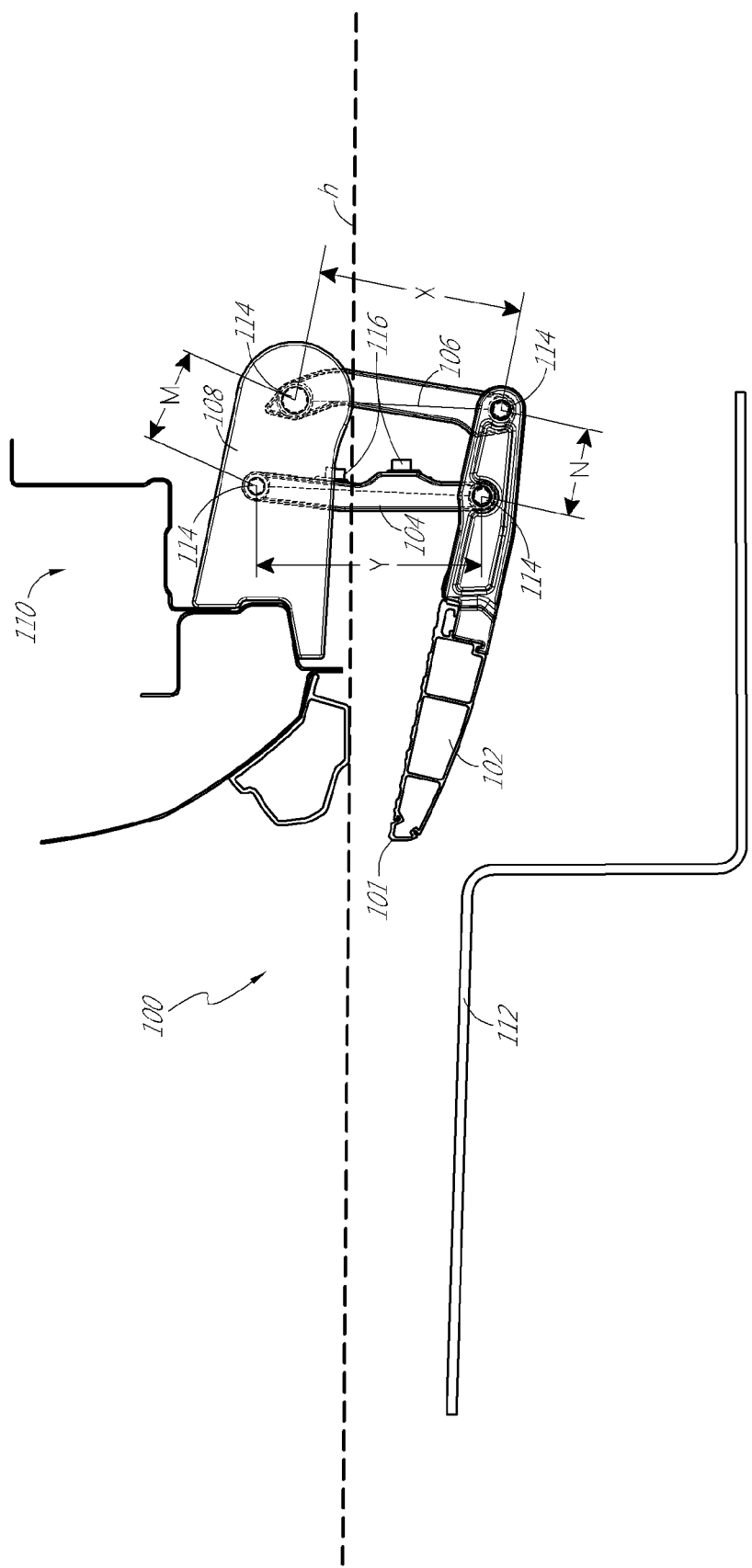
FIG. 12 illustrates a see-through view of an embodiment of a horizontal vehicle step.

FIG. 12 illustrates an embodiments of a horizontal vehicle step 100 in an intermediate position, in particular to more easily show dimensions for some of the different parts of the horizontal vehicle step 100.

In some embodiments, the length (Y) of arm 104 is the same as the length (X) of arm 106. In some embodiments, the length (Y) of arm 104 is different than the length (X) of arm 106. In some embodiments, the length (Y) of arm 104 is less than the length (X) of arm 106. In some embodiments, the length (Y) of arm 104 is greater than the length (X) of arm 106.

In some embodiments, the distance (M) between the frame 108 rotation points 114 of arms 104/106 are the same as the distance (N) between the support component 103 rotation points 114 of arms 104/106. In some embodiments, the distance (M) between the frame 108 rotation points 114 of arms 104/106 is different than the distance (N) between the support component 103 rotation points 114 of arms 104/106. In some embodiments, the distance (M) between the frame 108 rotation points 114 of arms 104/106 is greater than the distance (N) between the support component 103 rotation points 114 of arms 104/106. In some embodiments, the distance (M) between the frame 108 rotation points 114 of arms 104/106 is less than the distance (N) between the support component 103 rotation points 114 of arms 104/106.

In some embodiments, arms 104/106 are not parallel when in the stowed position. In some embodiments, arms 104/106 are not parallel when in the intermediate position. In some embodiments, arms 104/106 are not parallel when in the deployed position. In some embodiments, arms 104/106 are not parallel through the entire range of motion of the horizontal vehicle step 100.

Components of the disclosed horizontal vehicle step 100 can comprise a structurally strong and/or light weight material. In some embodiments, the horizontal vehicle step 100 can comprise a fiber reinforced composite material such as a carbon fiber reinforced plastic or thermoplastic with, for example, a polymer matrix or resin. In some embodiments, the horizontal vehicle step 100 can comprise other suitable composites, plastics, thermoplastics, metals, alloys, ceramics, among others, with efficacy, as needed or desired. However, the particular material used does not limit the disclosure.

Self-Energizing Mechanism for Horizontal Vehicle Step

In some embodiments, the horizontal vehicle step 100 can be self-energizing in either the deployed or stowed position, or in both positions. For example, a planar four-bar linkage can be used in some embodiments of the horizontal vehicle step 100, allowing for stability and predictability in motion of the step. In some embodiments, a planar quadrilateral linkage can be used for self-energizing the horizontal vehicle step 100. In some embodiments, a planar quadrilateral crank-rocker linkage can be used, which is described below.

In the stowed and deployed positions (respectively shown in FIGS. 1 and 3), the horizontal vehicle step 100 is in a self-energized position so that a load applied to the top of the stepping platform 102 in a relatively downwards motion does not move the horizontal vehicle step 100 towards an intermediate position.

For example, any force exerted downward onto the rail the stepping platform 102 of horizontal vehicle step 100 desirably will increase the resistance of the horizontal vehicle step 100 to moving. In some embodiments, the stepping platform 102 would need to move upward before the horizontal vehicle step 100 can translate.

In some embodiments, a motor can be used in conjunction with the horizontal vehicle step 100. In some embodiments the motor can be rigidly mounted to the underside of a vehicle, such as through the use of a mounting bracket, thought he particular mounting method does not limit the disclosure. In some embodiments, the motor can be located generally adjacent to the horizontal vehicle step 100.

In some embodiments, the motor turns a pinion gear about an axis roughly parallel to the plane defined by the underbody of a vehicle. The pinion gear can mesh with drive teeth formed at the end of arm 106. Actuation of the motor can cause the pinion gear to rotate and the arm 106 to counter-rotate with respect to the motor and pinion gear. As the arm 106, rotates it can push the stepping platform 102 by virtue of its connection to support component 103. Thus, when the motor rotates, the motor can move the stepping platform 102 between a stowed position (FIG. 1) wherein the stepping deck is generally positioned inward from the exterior of the vehicle or fixed running board and a deployed position (FIG. 3) in which the stepping platform 102 is extended sufficiently to provide a step for at least the forefoot portion of a user's foot.

As the horizontal vehicle step 100 moves between the stowed position and the deployed position under the power of the motor, arm 104 rotates as well and the deployed position is reached when the stop 116 contact arm 106.

When the horizontal vehicle step 100 is in the deployed position, a downward force exerted on the stepping platform 102 causes stop 116 to bear against arm 106. This arrangement causes the load on the stepping platform 102 to be borne primarily by the support component 103 and arm 104. In the deployed position, the horizontal vehicle step 100 takes on a geometry such that the support component 103 and arm 104 are loaded in tension. The torque generated by a load on the stepping platform 102 is opposed by arm 106, which is thus loaded in axial compression. Due to the particular configuration, the motor is isolated from the load on the stepping platform 102.

This aspect of the horizontal vehicle step 100 prevents damage to the motor by eliminating "back-loading," as there is no torque reaction about the end of arm 106, even when very heavy loads are placed on the stepping platform 102. Thus the motor is not needed to exert a counter-torque on arm 106 to support the load on the stepping platform 102. This feature also eliminates the need for balky, unreliable clutches or any other means of disconnecting the motor from the horizontal vehicle step 100, or retractable stops or the like to engage and support the horizontal vehicle step 100 when in the extended position.

With these features the horizontal vehicle step 100 provides a practical stepping assist for a vehicle user, which can be quickly moved into an extended position for use and retracted out of the way when necessary. As detailed above, this functionality is provided with a minimum of mechanical complexity and a high level of reliability. Moreover, the horizontal vehicle step 100 is easily connected to a vehicle's existing systems to allow even greater usability. For example, the motor may be connected to the vehicle's electrical system to cause the horizontal vehicle step 100 to quickly move to the extended position upon shutting off the vehicle's engine, placing the vehicle in park, opening a door, or signaling the power door-lock system with a remote device or control such as a key fob control. Similarly, the motor may be signaled to retract the horizontal vehicle step 100 upon starting the engine, placing the vehicle in drive, closing or locking the door(s) with which the step is associated, etc.

In the embodiment presently under discussion, when the horizontal vehicle step 100 is in the stowed position, it is concealed, preferably completely concealed, from the view of a typical standing adult curbside observer of the vehicle. In this position the horizontal vehicle step 100, can be disposed behind the lowest extension or lower edge of the vehicle underbody. In some embodiments, the horizontal vehicle step 100 is not visible to an adult standing 5 feet from the vehicle; in some embodiments, the horizontal vehicle step 100 is not visible to an adult standing 10 feet from the vehicle; in some embodiments, the horizontal vehicle step 100 is not visible to an adult standing 20 feet from the vehicle.

In some embodiments, a clutch may be used as well.

In some embodiments, in the self-energized position there can be some slight rotational movement of the stepping platform 102. For example, the stepping platform 102 can rotate approximately 0.5, 1, 2, 3, 4, or 5 degrees without movement of the horizontal vehicle step 100 or/or moving the horizontal vehicle step 100 to a position where the horizontal vehicle step 100 is not still self-energized. In some embodiments, the stepping platform 102 can rotate approximately less than 0.5, 1, 2, 3, 4, or 5 degrees without translating the horizontal vehicle step 100 or/or moving the horizontal vehicle step 100 to a position where the horizontal vehicle step 100 is not still self-energized. This ensures that the horizontal vehicle step 100 remains self-energized even if the stepping platform 102 is bumped and/or moves somewhat.

From the foregoing description, it will be appreciated that embodiments of an inventive horizontal vehicle step are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such steps need not be performed in the particular order shown or in sequential order, and that all steps need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A horizontally extending step comprising:
   an attachment frame configured to attach to a vehicle; and
   a stepping fixture comprising:
      a pair of arms rotatably attached to the frame and extending away from the frame, wherein one of the pair of arms is rotatable about a first horizontal axis and the other of the pair of arms is rotatable about a second horizontal axis;
      a support component rotatably connected to the pair of arms; and
      a stepping platform attached to the support component, said stepping platform defining a stepping surface;
      wherein the stepping fixture is configured to rotate between a stowed and deployed position;
      wherein the stepping platform remains generally parallel to a plane P, defined by a plane passing along the stepping surface when the stepping platform is in the stowed position, both when in the stowed and in the deployed position; and
      wherein a distal tip of the stepping platform remains within 1 inch in the vertical direction between the stowed position, the deployed position, and an intermediate position located halfway between the stowed and deployed positions.

2. The horizontally extending step of claim 1, wherein an angle between the plane defined by the stepping surface extending outwards away from the vehicle and a horizontal plane extending outwards away from the vehicle does not decrease in angle more than 15° from the stowed to the deployed position.

3. The horizontally extending step of claim 1, wherein an angle between the plane defined by the stepping surface extending outwards away from the vehicle and a horizontal plane extending outwards away from the vehicle does not decrease or increase in angle more than 15° from the stowed to the deployed position.

4. The horizontally extending step of claim 1, wherein the stepping platform remains generally parallel to $P_s$ from the stowed to the deployed position.

5. The horizontally extending step of claim 1, wherein the stepping platform and support component are a single piece.

6. The horizontally extending step of claim 1, wherein the pair of arms are not parallel in the stowed or deployed positions.

7. The horizontally extending step of claim 1, wherein the support component is generally flat.

8. The horizontally extending step of claim 1, wherein the support component remains generally parallel to $P_s$ from the stowed to the deployed position.

9. The horizontally extending step of claim 1, wherein the horizontally extending step is self-energizing in the stowed position.

10. The horizontally extending step of claim 1, wherein the horizontally extending step is self-energizing in the deployed position.

11. The horizontally extending step of claim 1, wherein the plane defined by the stepping surface has a positive angle with relation to a horizontal plane when the stepping fixture is in an intermediate position located halfway between the stowed and deployed position.

12. The horizontally extending step of claim 1, wherein a distal tip of the stepping platform remains within 0.5 inches in the vertical direction between the stowed position, the deployed position, and an intermediate position located halfway between the stowed and deployed positions.

13. A horizontally extending step comprising:
   a pair of arms configured to be rotatably attached to a vehicle and extending away from the vehicle, wherein one of the pair of arms is rotatable about a first horizontal axis and the other of the pair of arms is rotatable about a second horizontal axis; and
   a stepping platform rotatably connected to the pair of arms;
   wherein the stepping platform is configured to rotate between a stowed, an intermediate, and deployed position, the intermediate position being located halfway between the stowed and deployed positions;
   wherein the stepping platform has a generally fixed orientation between the stowed, intermediate, and deployed positions;
   wherein a distal tip of the stepping platform remains within 1 inch in the vertical direction between the stowed position, the deployed position, and the intermediate position.

14. The horizontally extending step of claim 13, wherein the horizontally extending step is self-energizing in the stowed position.

15. The horizontally extending step of claim 13, wherein the horizontally extending step is self-energizing in the deployed position.

16. A horizontally extending step comprising:
   a frame configured to attach to a vehicle; and
   a stepping fixture comprising:
      a distal and a proximal arm rotatably attached to the frame and extending away from the frame, wherein the distal arm is rotatable about a first horizontal axis and the proximal arm is rotatable about a second horizontal axis;

a support component rotatably connected to the distal arm and the proximal arm; and a stepping platform attached to the support component, the stepping platform being closer to the distal arm than the proximal arm;

wherein the stepping fixture is configured to rotate between a stowed, an intermediate, and deployed position, the intermediate position being located halfway between the stowed and deployed positions;

wherein an angle between the stepping platform and the distal arm is at least 110° in the deployed position; and wherein a distal tip of the stepping platform remains within 1 inch in the vertical direction between the stowed position, the deployed position; and the intermediate position.

17. The horizontally extending step of claim 16, wherein the angle is greater than 120° in the deployed position.

18. The horizontally extending step of claim 16, wherein the angle is greater than 135° in the deployed position.

19. The horizontally extending step of claim 16, wherein the angle is less than 180° in the deployed position.

20. The horizontally extending step of claim 19, wherein the horizontally extending step is self-energizing in the stowed position.

21. The horizontally extending step of claim 19, wherein the horizontally extending step is self-energizing in the deployed position.

* * * * *

UNITED STATES PATENT AND TRADEMARK OFFICE
CERTIFICATE OF CORRECTION

PATENT NO. : 9,522,634 B1  
APPLICATION NO. : 14/846370  
DATED : December 20, 2016  
INVENTOR(S) : Anthony Smith Page 1 of 1

It is certified that error appears in the above-identified patent and that said Letters Patent is hereby corrected as shown below:

In the Claims

In Column 11 at Line 51, In Claim 1, change "P," to --$P_s$--.

Signed and Sealed this  
Eighteenth Day of April, 2017

Michelle K. Lee  
*Director of the United States Patent and Trademark Office*